US010164927B2

(12) United States Patent
Goutal

(10) Patent No.: US 10,164,927 B2
(45) Date of Patent: Dec. 25, 2018

(54) SAFE UNSUBSCRIBE

(71) Applicant: Vade Retro Technology Inc., San Francisco, CA (US)

(72) Inventor: Sebastien Goutal, Cysoing (FR)

(73) Assignee: VADE SECURE, INC., San Francisco, CA (US)

( * ) Notice: Subject to any disclaimer, the term of this patent is extended or adjusted under 35 U.S.C. 154(b) by 205 days.

(21) Appl. No.: 14/597,142

(22) Filed: Jan. 14, 2015

(65) Prior Publication Data

US 2016/0205055 A1 Jul. 14, 2016

(51) Int. Cl.
| | |
|---|---|
| *G06F 15/16* | (2006.01) |
| *H04L 12/58* | (2006.01) |
| *H04W 4/12* | (2009.01) |
| *H04W 12/12* | (2009.01) |

(52) U.S. Cl.
CPC ............ *H04L 51/18* (2013.01); *H04W 4/12* (2013.01); *H04W 12/12* (2013.01)

(58) Field of Classification Search
CPC .............................. H04L 51/18; H04L 67/146
USPC ........................................ 709/206, 207, 204
See application file for complete search history.

(56) References Cited

U.S. PATENT DOCUMENTS

| | | | |
|---|---|---|---|
| 8,079,087 B1 | 12/2011 | Spies | |
| 8,135,790 B1 * | 3/2012 | Castelli | G06Q 10/107 709/206 |
| 8,468,597 B1 | 6/2013 | Warner | |
| 8,874,658 B1 | 10/2014 | Khalsa et al. | |
| 9,332,022 B1 | 5/2016 | Ashley | |
| 2005/0228899 A1 | 10/2005 | Wendkos et al. | |
| 2006/0117307 A1 | 6/2006 | Averbuch | |
| 2007/0078936 A1 | 4/2007 | Quinlan | |
| 2008/0133672 A1 | 6/2008 | Gillum | |
| 2008/0141342 A1 | 6/2008 | Curnyn | |
| 2010/0205259 A1 | 8/2010 | Vitaldevara et al. | |

(Continued)

OTHER PUBLICATIONS

International Search Report and Written Opinion of the International Searching Authority dated Mar. 11, 2016 in PCT/US2016/012285.

(Continued)

*Primary Examiner* — Ario Etienne
*Assistant Examiner* — Sahera Halim
(74) *Attorney, Agent, or Firm* — Young Law Firm, P.C.

(57) ABSTRACT

A computer-implemented method of unsubscribing a recipient of an electronic message may comprise identifying and extracting an unsubscribe Universal Resource Indicator (URI) from the electronic message and carrying out a dynamic unsubscribe scenario if the extracted unsubscribe URI does not match a known unsubscribe URI pattern. The dynamic unsubscribe scenario may comprise instructions that are selectively executed depending on contents of a single unsubscribe form in a webpage pointed to by the extracted unsubscribe URI. These instructions may comprise finding and filling in a single input field in the webpage that is relevant to unsubscribing with an electronic address of the recipient or finding and updating a user interface element that is relevant to unsubscribing. The single unsubscribe form with the filled in single relevant input field or updated user interface element may then be submitted and a determination may be made whether an unsubscribe confirmation message was generated.

21 Claims, 5 Drawing Sheets

(56) References Cited

U.S. PATENT DOCUMENTS

| | | |
|---|---|---|
| 2010/0251380 A1 | 9/2010 | Zhang |
| 2012/0158626 A1 | 6/2012 | Zhu |
| 2012/0259933 A1* | 10/2012 | Bardsley ................ H04L 12/58 709/206 |
| 2013/0086677 A1 | 4/2013 | Ma |
| 2013/0238721 A1* | 9/2013 | Patel ................... G06Q 10/107 709/206 |
| 2014/0082521 A1 | 3/2014 | Carolan et al. |
| 2014/0298460 A1 | 10/2014 | Xue |

OTHER PUBLICATIONS

Marco Cova, Christopher Kruegel, and Giovanni Vigna—There is no Free Phish: An Analysis of "Free" and Live Phishing Kits—Department of Computer Science, University of California, Santa Barbara, 2008, downloaded from https://www.usenix.org/legacy/event/woot08/tech/full_papers/cova/cova_html/ on Jun. 24, 2016.

Heather McCalley, Brad Wardman and Gary Warner—Chapter 12, Analysis of Back-Doored Phishing Kits; G. Peterson and S. Shenoi (Eds.): Advances in Digital Forensics VII, IFIP AICT 361, pp. 155-168, 2011. c IFIP International Federation for Information Processing 2011.

Tyler Moore and Richard Clayton—Discovering Phishing Dropboxes Using Email Metadata, Pre-publication copy, Nov. 2012. To appear in the proceedings of the 7th APWG eCrime Researchers Summit (eCrime).

Gmail Unsubscribe, downloaded from http://plus.google.com/+Gmail/posts/euJxGkND1Ao on Jan. 21, 2015.

Want to Unsubscribe from a Mailing List in Gmail? Look Up, Not Down, Matt Peckham, Time Magazine Feb. 25, 2014, downloaded from http://techland.time.com/2014/02/25/gmail-unsubscribe/ on Jan. 21, 2015.

Otherinbox Unsubscriber, downloaded from http://www.otherinbox.com/unsubscriber/ on Jan. 21, 2015.

USPTO Office Action dated Apr. 1, 2016 in U.S. Appl. No. 14/542,939.

USPTO Office Action dated Dec. 6, 2016 in U.S. Appl. No. 14/861,846.

\* cited by examiner

SAFE UNSUBSCRIBE

BACKGROUND

Embodiments are related to electronic messages such as emails. In particular, embodiments are related to the processing of unsubscribe requests from such electronic messages. In one embodiment, a Safe Unsubscribe process may be carried out that provides a "one-click" unsubscribe from emails.

DETAILED DESCRIPTION

Figure 1:
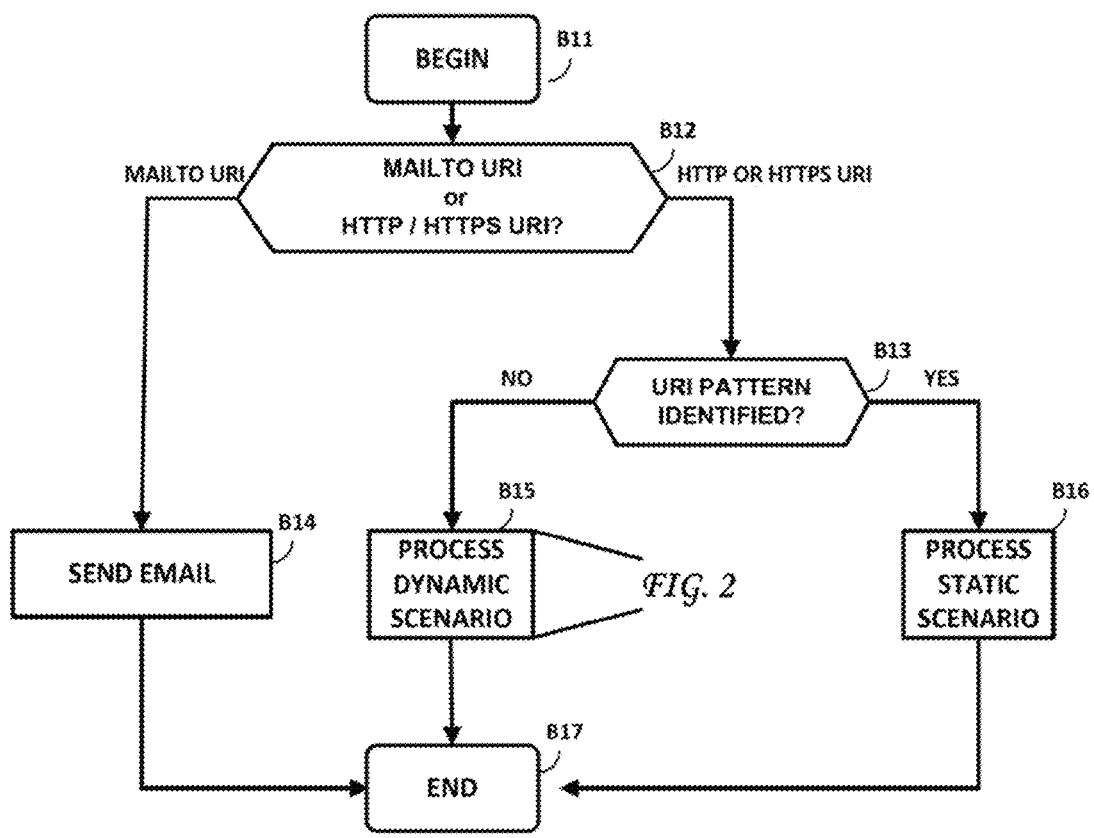
FIG. 1 is a block diagram of aspects of a method according to one embodiment.

Most emails provide an unsubscribe mechanism. For example, such emails can be:

Advertisements,
Newsletters,
Social network notifications,
Dating website notifications,
Mailing lists,
Alerts from classified ads, job search or real estate websites.

However, the unsubscribe process for the end user can be complex. Indeed, the unsubscribe process may require the user:

to type its email address in a text field, and/or
to check a checkbox, and/or
to select a radio button, and/or
to fill in and submit a form.

Moreover, a significant portion of end users are reluctant to click on an unknown unsubscribe link, as they fear that doing so may expose their computing device to malware or virus infection.

In order to improve the end user experience, one embodiment provides a one-click unsubscribe for the end user. According to one embodiment, to unsubscribe, the end-user only need carry out a single user action (such as clicking on an Unsubscribe button, for example) within his or her favorite webmail. According to one embodiment, responsive to this single user action, the unsubscribe process may then be carried out on behalf of and without further involvement from the end user. According to one embodiment, the input data for an unsubscribe request may then be extracted from the electronic message (e.g., email) from which the user wishes to unsubscribe. Prior to describing further aspects of an embodiment, however, a few significant topics are covered.

Uniform Resource Identifier

A Uniform Resource Identifier (URI) is a string of characters used to identify a name of a computing resource. Such identification enables interaction with representations of the resource over a network, typically the World Wide Web, using specific protocols. Schemes specifying a concrete syntax and associated protocols define each URI. The most common form of URI is the uniform resource locator (URL), which is frequently referred to informally as a web address. The URI syntax consists of a URI scheme name (such as "http", "https", "ftp", "mailto", "crid" or "file") followed by a colon character, and then by a scheme-specific part. The specifications that govern the schemes determine the syntax and semantics of the scheme-specific part.

Email Messages

Email messages typically comprise a message header section and a message body. Each message has exactly one header section, which is structured into header fields. Each header field has a name and a value. RFC 5322 specifies the precise syntax. Informally, each line of text in the header section that begins with a printable character begins a separate header field. The header field name starts in the first character of the line and ends before the separator character ":". The separator is then followed by the header field value (the "body" of the header field). The message header section must include at least the following header fields:

From: The email address, and optionally the name of the author(s).

Date: The local time and date when the message was written.

The message header section should include at least the following header fields:

Message-ID: Also an automatically generated header field; used to prevent multiple delivery and for reference in "In-Reply-To".

In-Reply-To: Message-ID of the message to which this message is a reply. Used to link related messages together. This header field only applies for reply messages.

Common header fields for email include:

To: The email address(es), and optionally name(s) of the message's recipient(s). Indicates primary recipient(s).

Subject: A brief summary of the topic of the message.

Cc: Carbon copy, indicates other recipients of this message.

Bcc: Blind carbon copy; addresses added to the SMTP delivery list but not (usually) listed in the message data, remaining invisible to other recipients.

Content-Type: information about how the message is to be displayed, usually a MIME type.

Reply-To: Address that should be used to reply to the message.

Sender: Address of the actual sender acting on behalf of the author listed in the "From" header field.

Extraction of Data from Electronic Messages

According to one embodiment, the data extracted from an electronic message such as an email from which the user wishes to unsubscribe may comprise one or more of the following:

UNSUBSCRIBE_URI: Unsubscribe URI (http/https URI or mailto URI) extracted from "List-Unsubscribe" email header field and email body;

UNSUBSCRIBE_RECIPIENT: Email address extracted preferably from SMTP (Simple Mail Transfer Protocol, an Internet standard for e-mail transmission), RCPT TO command, otherwise extracted from the "To" email header field. This email address identifies the primary recipient of the message;

UNSUBSCRIBE_FROM: Email address extracted from the "From" email header field that identifies the author of the message; and/or UNSUBSCRIBE_REPLY_TO: Email address extracted from the "Reply-To" email header field that identifies the mailbox to which the author of the message suggests that replies be sent.

The cardinality constraints associated with these extracted data are the following.

| Data | Cardinality |
|---|---|
| UNSUBSCRIBE_URI | 1 . . . n |
| UNSUBSCRIBE_RECIPIENT | 1 . . . 1 |
| UNSUBSCRIBE_FROM | 0 . . . 1 |
| UNSUBSCRIBE_REPLY_TO | 0 . . . 1 |

Indeed, there may be one or more UNSUBSCRIBE_URIs, only one UNSUBSCRIBE_RECIPIENT, zero or one UNSUBSCRIBE_FROM and zero or one UNSUBSCRIBE_REPLY_TO in the data extracted from the electronic message from which the user wishes to unsubscribe (e.g., not receive further like messages).

More than one http/https UNSUBSCRIBE_URIs mail be identified and extracted from the electronic message. For example, one or more links may be identified in the electronic message that are not UNSUBSCRIBE_URIs; the electronic message (e.g., email) may contain more than one different UNSUBSCRIBE_URIs that may lead to the same unsubscribe webpage, and/or the electronic message may provide different UNSUBSCRIBE_URIs such as unsubscribe from this newsletter only, unsubscribe from all mailings, among other possibilities. According to one embodiment, the UNSUBSCRIBE_URI(s) may be identified and extracted from a header field and/or the body of the electronic message. The body of the electronic message may contain a text portion and a html portion. The text portion may comprise a simplified version of the electronic message that may be used to electronic devices having limited display capabilities (e.g., UNIX terminals, small screen devices, old cell phones and the like). The html portion of the electronic message comprises a complex display in html. According to one embodiment, each identified and extracted UNSUBSCRIBE_URIs may be processed as described below, one after the other.

According to one embodiment, an output or outcome of the present safe unsubscribe process for an unsubscribe request may be one of the following.

| Output | Description |
|---|---|
| SUCCESS | Recipient has been unsubscribed. |
| FAILURE | Recipient has not been unsubscribed (or the unsubscribe cannot be verified). |

Unsubscribe Request Processing

According to one embodiment, each unsubscribe request submitted returns either SUCCESS as soon as an UNSUBSCRIBE_URI has been successfully processed or FAILURE if no UNSUBSCRIBE_URI has been successfully processed. The processing of UNSUBSCRIBE_URI is described in the FIG. 1. As shown therein, the method begins at block B11, whereupon it may be determined at B12 whether the URI identified and extracted from the email from which the user wishes to unsubscribe is a MAILTO URI or an HTTP or HTTPS URI. If the URI is a MAILTO URI, then an unsubscribe email may be sent to the address specified by MAILTO URI, as shown at block B14, according to the MAILTO scheme. If the mail is successfully delivered (which may generate an SMTP return code of 250), the unsubscribe attempt may be considered to have been successful.

If the extracted UNSUBSCRIBE_URI data is determined at B12 to be an http/https URI, an unsubscribe scenario may be processed. According to one embodiment, a scenario may include a complex control flow of instructions written in a programing language. According to one embodiment, the instructions of the scenario may be written in the Lua programming language. Lua is lightweight multi-paradigm programming language, written in ANSI C, designed as a scripting language. This scripting language may be used to describe basic interactions with the webpage being processed. Embodiments, however, are not limited to instructions written in the Lua language. According to one embodiment, the scenarios may comprise instructions for:

finding an html element,
    reading value of an html element attribute,
    writing value of an html element attribute,
    clicking an html element,
    submitting an html form, and
    receiving, detecting or otherwise finding an unsubscribe confirmation message.

According to one embodiment, if the http/https UNSUBSCRIBE_URI matches a known URI pattern, then a known sender has been identified and a static scenario may be processed. Specific URI patterns may become "known" if they originate, for example, from high volume senders for which unsubscribe scenarios have previously been developed. In this manner, known URI patterns, once detected, may be processed using, as shown at B16, a predetermined scenario, a scenario that has previously been determined to have been successful for that sender. A static scenario, therefore, may be appropriate for unsubscribing from a known sender and may be sender-specific. For example, static unsubscribe scenarios may have been developed for known and high-volume senders such as Amazon, Groupon, Apple, Twitter or Facebook, to name but a few known, high-volume senders of electronic messages.

To illustrate unsubscribing from an exemplary and known "ExampleSender", the following is an example of a static scenario that may be processed as shown at B16 in FIG. 1:

```
<sender id="6000" name=" ExampleSender " type="sender">
    <scenario id="0">
    <identification>https?://www.examplesender.com/o.
       php\?k=[a-zA-Z0-9\-_]+&u=[0-9]+&mid=[a-zA-Z0-
       9\-]+</identification>
    <script>
    local webdata = getWebData(getInitialUrl( ))
       if webdata == nil then
    return
    end
    local formdata = findForm(webdata, "^action$",
"/o\.php")
       if formdata == nil then
       return
    end
    webdata = submitForm(formdata)
    if webdata == nil then
    return
    end
    findConfirmation(webdata, "Your settings have been
updated")
    </script>
    </scenario>
</sender>
```

As shown, "ExampleSender" is identified by matching UNSUBSCRIBE_URI with a known, for this sender, regular expression defined in identification element. The script element contains the unsubscribe scenario to be processed for unsubscribing from electronic messages (e.g., emails) from the sender ExampleSender:

access and get the webpage pointed to by the identified and extracted UNSUBSCRIBE_URI,
    find an html form whose action attribute contains the known "/o.php\" regular expression,
    submit the html form, and
    find "Your settings have been updated" or functionally similar unsubscribe confirmation message.

If a suitable confirmation message is returned, such as the "Your settings have been updated" message above, the unsubscribe process of block B16 is considered to have been successful.

According to one embodiment, if it is determined, in block B13, that the http/https URI does not match a known URI pattern, a dynamic scenario be processed, as shown at B15. The method may end at B17.

Dynamic Scenario

Figure 2:
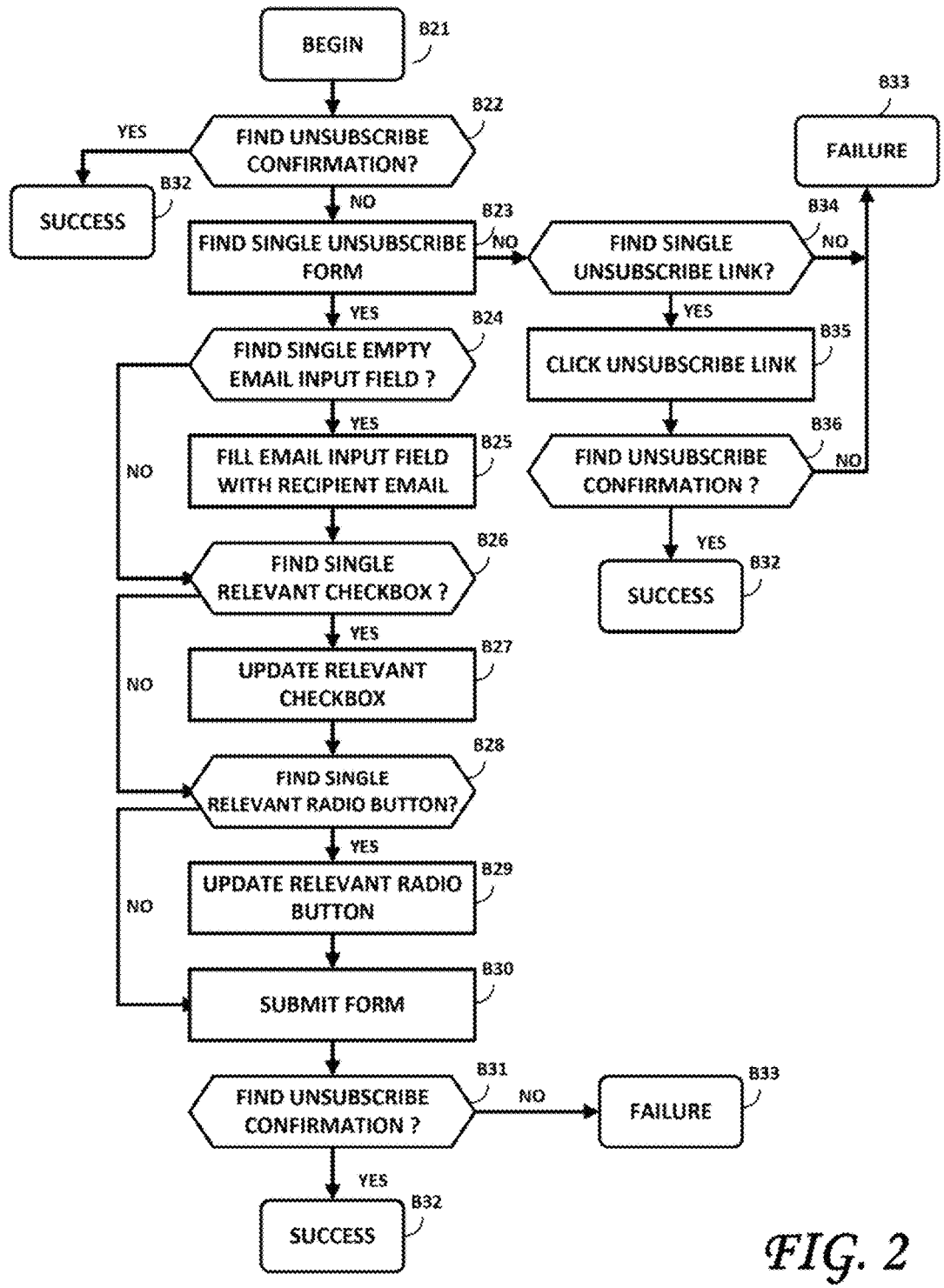
FIG. 2 is a block diagram of aspects of a method according to one embodiment.

According to one embodiment, a dynamic scenario may rely on an analysis of the content of a webpage to determine the best way to unsubscribe the user from future like electronic messages. One embodiment of a dynamic scenario is shown in FIG. 2.

The processing of a dynamic unsubscribe scenario, according to one embodiment, begins at B21. At B22, it may be determined whether an unsubscribe confirmation message has been found, received or detected. To do so, the text of the webpage may be searched for a message that confirms that the unsubscribe request was processed, or otherwise taken into account. For example, the message may be of the form "You have been successfully removed from our email list" or any equivalent message that indicates a successful unsubscription. According to one embodiment, such a text search may be multilingual and carried out with regular expressions. An example of an unsubscribe confirmation regular expressions may include, for example "(you ["] re |you are) successfully unsubscribed".

Other possible examples of unsubscribe confirmation:
    Your request has been taken into account
    You have been unsubscribed from our newsletters
    Unsubscription successfully completed
    We've removed you from the mailing list Receipt of any suitable unsubscribe confirmation may indicate success of the unsubscribe procedure, as shown in FIG. 2 at B32. These messages may be matched against known stored unsubscribe confirmations or natural language processing techniques may be leveraged to determine the likelihood that a given message may be indicative of a successful unsubscribe process.

Block B23 calls for finding single unsubscribe form. To do so, a search may be carried out for a single unsubscribe html form in the webpage. A single unsubscribe html form may be considered to have been found if one or both of the following conditions is fulfilled:

The html form contains a relevant keyword in id or action or data attributes. Such a relevant key word may be, for example, "optout" such as shown in Example 1 below:
    <form action="MemberOptout.asp" method="post" name="eform">

EXAMPLE 1

The html form comprises a submit or image child element that contains a relevant keyword, for example, "unsubscribe" in id or name or value attributes such as shown in Example 2 below:

```
<form>
...
<input type="submit" name="submit" value="unsubscribe">
...
</form>
```

EXAMPLE 2

According to one embodiment, there may be exactly one unsubscribe html form. If no single unsubscribe form is found in B23, block B23 is considered a failure.

At block B24, it may be determined whether a single empty email input field has been found. To do so, a search may be carried out for a single empty email input field in the unsubscribe form child elements. The empty email input field may be considered to have been found if all of a predetermined number of conditions are fulfilled. Such conditions may comprise, for example:

The html element is an input element and has a relevant keyword in id or name attributes,
    The html element has no value attribute or the value attribute is empty.

According to one embodiment, there must be exactly one empty email input field in the unsubscribe form child elements. Otherwise, B24 is considered a failure, whereupon the "NO" branch of block B24 is followed. The following examples illustrate a single empty email input field, with the relevant keyword highlighted in bold:

```
<input type="hidden" name="email" value="">
<input type="text" name="email_field">
```

Block B25 in FIG. 2 may be carried out when a single empty email field is found (YES branch of B24). Block B25 calls for filling the found single email input field with the recipient email. To do so, the value attribute of the empty email input field may be set with UNSUBSCRIBE_RECIPIENT, which identifies the primary recipient of the message.

If, in B24, a single empty email input field is not found, the processing of the unsubscribe dynamic scenario may proceed to block B26, at which it may be determined whether a single relevant checkbox has been found. To do so, a search may be carried out to find a single relevant checkbox (i.e., html input element of the checkbox type) in the unsubscribe form child elements. There must be exactly one relevant checkbox in the unsubscribe form child elements. Otherwise, block B24 is considered a failure. According to one embodiment, a checkbox may be considered as relevant if any one of the conditions 1-5 below is fulfilled:

(1) The checkbox has a relevant keyword in name or id or value or onclick attributes, as shown in Example 3 below, with the relevant keyword highlighted in bold:

```
<input type="checkbox" name="unsubscribe" value="on"
id="unsubscribe" class="left">
```

EXAMPLE 3

(2) The checkbox is linked to an html label element that contains a relevant text node, as shown in Example 4 below, with the relevant keyword highlighted in bold:

```
<input type="checkbox" name="all" value="1" />
<label for="all">Please unsubscribe me from all
emails</label>
```

EXAMPLE 4

(3) The parent node of the checkbox is <p> (paragraph) or <div> (division), has only one child checkbox node and has a relevant child text node, as shown in Example 5 below, with the relevant keyword highlighted in bold:

```
<p>
    <input type="checkbox" name="rm" value="1" />
    <span class="aqua-txt">

Remove me from the future mailings

</spam>
</p>
```

EXAMPLE 5

(4) The sibling node of the checkbox is a relevant text node, as shown in Example 6 below, with the relevant keyword highlighted in bold:
<input type="checkbox" name="GenForm" id="GenForm">
Confirm unsubscribe

EXAMPLE 6

(5) The adjacent cell in an html table is a relevant text node (See example 7):
The parent node of the checkbox is <td>,
The grandparent node of the checkbox is <tr>,
The sibling of the parent node of the checkbox is <td> and has a relevant child text node.

```
<tr>
    <td align="left" valign="top" width="24">
        <input type="checkbox" value="1" name="action">
    </td>
    <td align="left" valign="top" width="24">
        Unsubscribe me from monthly newsletter
    </td>
</tr>
```

EXAMPLE 7

In FIG. 2, after B26 is carried out, the relevant checkbox may then be updated as shown at block B27, where the relevant checkbox is clicked or checked, if it has not already been clicked or checked.

If, in block B26, no relevant checkbox is found, the method may proceed to B28 (NO branch of B26). At block B26, a search for a single relevant radio button may be carried out. To do so, a search may be initiated for a single relevant radio button (i.e., an html input element of the radio button type) in the unsubscribe form child elements. There must be exactly one relevant radio button in the unsubscribe form child elements. Otherwise, block B26 may be considered to have failed. According to one embodiment, a radio button is considered as relevant if one the conditions 1-6 is fulfilled:

(1) The radio button has a relevant keyword in id or value or onclick attributes, as shown in Example 8 below, with the relevant keyword highlighted in bold:

```
<p>
    <input type="radio" value="continue" name="action">
    Continue
</p>
<p>
    <input type="radio" value="unsubscribe" name="action">
    Stop
</p>
```

EXAMPLE 8

(2) The radio button has a relevant keyword in name attribute and an affirmative keyword (such as yes) in value attribute, as shown in Example 9 below, with the relevant keyword highlighted in bold:

```
<p>
    <input type="radio" value="no" name="unsubscribe">
    I've changed my mind, do not unsubscribe me
</p>
<p>
    <input type="radio" value="yes" name="unsubscribe">
    I confirm my request
</p>
```

EXAMPLE 9

(3) The radio button is linked to an html label element that contains a relevant text node, as shown in Example 10 below, with the relevant keyword highlighted in bold:

```
<input id="radio_24" name="action" type="radio" value="1"/>
<label for="radio_24">Unsubscribe me</label>
<input id="radio_25" name="action" type="radio" value="0"/>
<label for="radio_25">Keep me subscribed</label>
```

EXAMPLE 10

(4) The parent node of the radio button is <p> or <div>, as shown in Example 11 below, with the relevant keyword highlighted in bold:
<p>

```
<input type="radio" value="no" name="choice">
    Please continue sending me emails
</p>
<p>
    <input type="radio" value="yes" name="choice">
        Remove me from mailing list
</p>
```

EXAMPLE 11

(5) The sibling node of the radio button is a relevant text node, as shown in Example 12 below, with the relevant keyword highlighted in bold:

```
<input type="radio" value="0" name="Action">
    Please remove me from all future emails.
<input type="radio" value="No" name="Action">
    Please don't remove me, I think I'll stay.
```

EXAMPLE 12

(6) The adjacent cell in an html table is a relevant text node (See example 13):
The parent node of the radio button is <td>,
The grandparent node of the radio button is <tr>,
The sibling of the parent node of the radio button <td> and has a relevant child text node.

```
<tr>
    <td align="left" valign="top" width="24">
    <input type="radio" value="1" name="action">
    </td>
    <td align="left" valign="top" width="24">
    Please unsubscribe me
    </td>
</tr>
<tr>
    <td align="left" valign="top" width="24">
    input type="radio" value="0" name="action">
    </td>
    <td align="left" valign="top" width="24">
    Keep me subscribed
    </td>
</tr>
```

EXAMPLE 13

The requirements discussed above with respect to the Examples developed herein are HTML-specific. It is to be noted, however, that embodiments are not limited to such specific exemplary implementations and that other implementations that are not limited to HTML are possible, as those of skill in this art may appreciated.

Returning to FIG. 2, if a single relevant radio button was found (YES branch of B28), the found relevant radio button may be updated (clicked or otherwise selected) if not already updated, as shown at B29. According to one embodiment, the found single unsubscribe form may then be submitted, as shown at B30. This single unsubscribe form may be submitted after finding it, without updating any relevant field or user interface element (NO branches of B24, B26 and B28), if no such relevant fields or user interface elements (e.g., checkbox, radio button, pull down window and the like) are found. Alternatively, the form may be submitted in B 30 after having updated one or more of a single empty email input field, relevant checkbox, relevant radio button or other found user interface element that may logically be related to unsubscribing the electronic message (e.g., email, spam) recipient from further emails from this sender.

Block B31 in FIG. 2 calls for finding a confirmation that the unsubscribe form submitted ion B30 was successfully processed. This may be carried out in the same or a similar manner as was block B22. Upon receiving, finding or otherwise detecting an unsubscribe confirmation message or indication at B31, the user may be considered to have been successfully unsubscribed at B32. Otherwise, the unsubscribe process may be deemed a failure, as shown at B33.

In B34, a search may be initiated to find a single unsubscribe link in the webpage. There must be exactly one unsubscribe link in the webpage. Otherwise, B34 may be considered to have failed. The unsubscribe link (i.e., html a element) may be considered to have been found, according to one embodiment, if one of these conditions is fulfilled:

There is a relevant keyword in href or id attributes, as shown in Example 14 below, with the relevant keyword highlighted in bold:

```
<a id = "unsubscribe_link" href =
"/EB2nN7Dlrve/ezqBmsM_XIrZQohOOE" >click here</a>
```

EXAMPLE 14

There is a relevant keyword in the child text node of the unsubscribe, as shown in Example 15 below, with the relevant keyword highlighted in bold:

```
<a href="http://str34.net/u/2106317093/44569913">Yes, please
unsubscribe me from the newsletter</a>
```

EXAMPLE 15

According to one embodiment, if no single unsubscribe form is found, (NO branch of B23), the unsubscribe process may attempt to find a single unsubscribe link, as shown at B34. If no single unsubscribe link is found (NO branch of B34), the unsubscribe attempt may be considered to have been a failure, as shown at B38. If however, a single unsubscribe link is indeed found, (YES branch of B34), the unsubscribe link may be clicked as shown at B35.

Block B36 in FIG. 2 calls for detecting the presence of, receiving or otherwise finding an unsubscribe confirmation message or indication. If such an unsubscribe confirmation is found (YES branch of B36), the user may be considered to have been successfully unsubscribed at B32. Otherwise, the unsubscribe process may be deemed a failure, as shown at B33.

Figure 3:
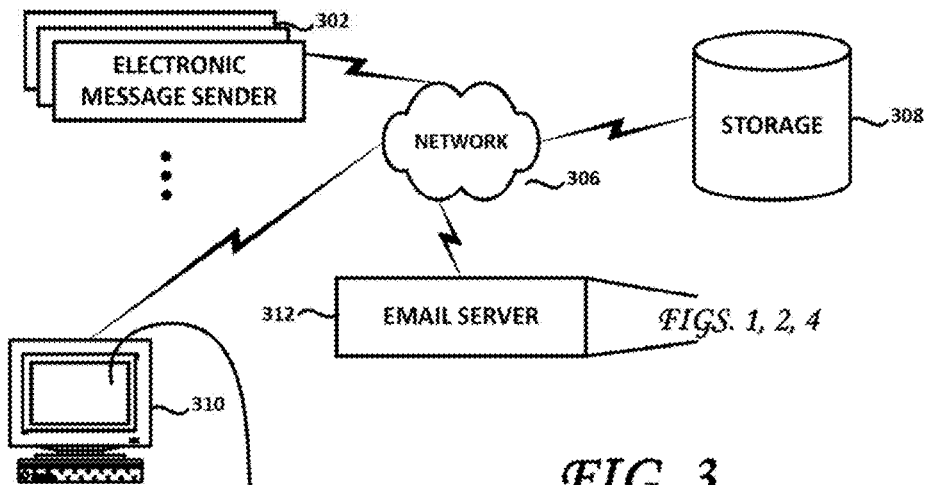
FIG. 3 is a block diagram of a system suitable for implementing an embodiment.
Figure 3:
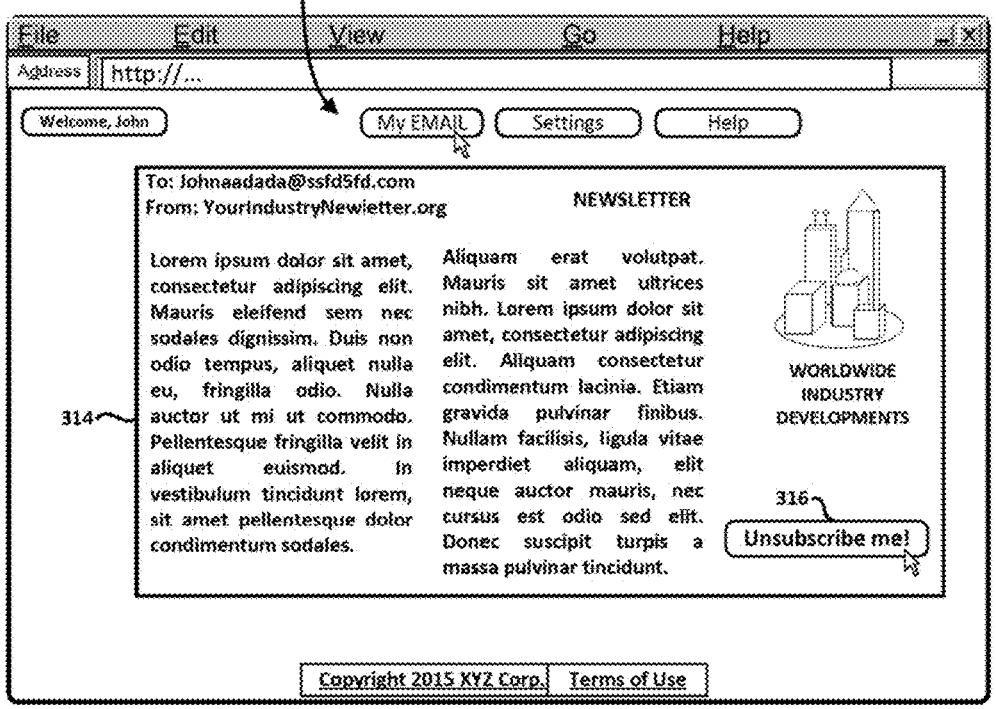

FIG. 3 is a block diagram of a system suitable for an embodiment. As shown therein, a computer network 306 (including, for example, the Internet) may couple an email server 312 to one or more electronic message senders 302. The electronic message senders 302 may be configured to send electronic messages (e.g., emails) on behalf of a plurality of large (e.g., Facebook, Amazon, Yahoo and the like) senders and on behalf of smaller senders and bulk emailers. Herein, bulk emails may be distinguished from "spam" emails. Spam emails are, by design, unsolicited emails. On the contrary, bulk email is most often solicited. Moreover, it is not relevant or recommended to attempt to unsubscribe from spam as spammers typically do not take into account or honor unsubscribe requests. In fact, responsive to a received unsubscribe request, spammers may even send more spam to this address, as the receipt of an unsubscribe request from an email address confirms that the end user exists and that the email address is active. Accordingly, one embodiment displays an unsubscribe button only for non-spam emails that provide an unsubscribe mechanism. In FIG. 3, the electronic message recipient 310 may also be coupled to the email server 312 through the computer network 306. Network 306 provides a communications infrastructure for communications between the electronic message senders 302, the email server 312 and the electronic message recipient 310. Network 312 may comprise various components and network elements, such as routers, switches, hubs, etc. The network 312 may support various communications protocols, such as Ethernet, Internet protocols, etc. In addition, the network 312 may be implemented as a wired or wireless network or a combination thereof. The electronic message recipient 310 may be configured to access the email server 312 to retrieve electronic messages therefrom. One exemplary electronic message (e.g., webmail shown in a browser) is shown at 314 in FIG. 3. However, embodiments are also applicable in the case in which the electronic messages are downloaded and rendered in an email client such as Apple Mail or Microsoft Outlook, for example).

One embodiment enables a recipient of an electronic message to unsubscribe from such electronic messages by carrying out a single action such as clicking on a button such as shown at 316. Responsive to detecting such single action, a signal may be sent to email server 312 to unsubscribe the recipient from future like emails from this sender. In the example shown in FIG. 3, the sender is a professional organization and the electronic message is a newsletter. Responsive to receiving the signal(s) requesting the recipient to be unsubscribed from the electronic message, the email server 312 may carry out the method of FIGS. 1, 2 and 4. It is to be understood that a mail server may only be responsible for the sending of electronic messages with the SMTP protocol. An application server, on the other hand, may handle http/https unsubscribe requests and updates its database accordingly so that the recipient will not receive future mailings. The application server is also responsible for the creation of the mailing campaigns and the mail server is responsible of the delivery of the electronic messages. For simplicity of illustration, however, only a single server 312 is shown in FIG. 3 at 312, it being understood that server 312 shown in FIG. 3 may be implemented as separate application and mail servers.

Figure 4:
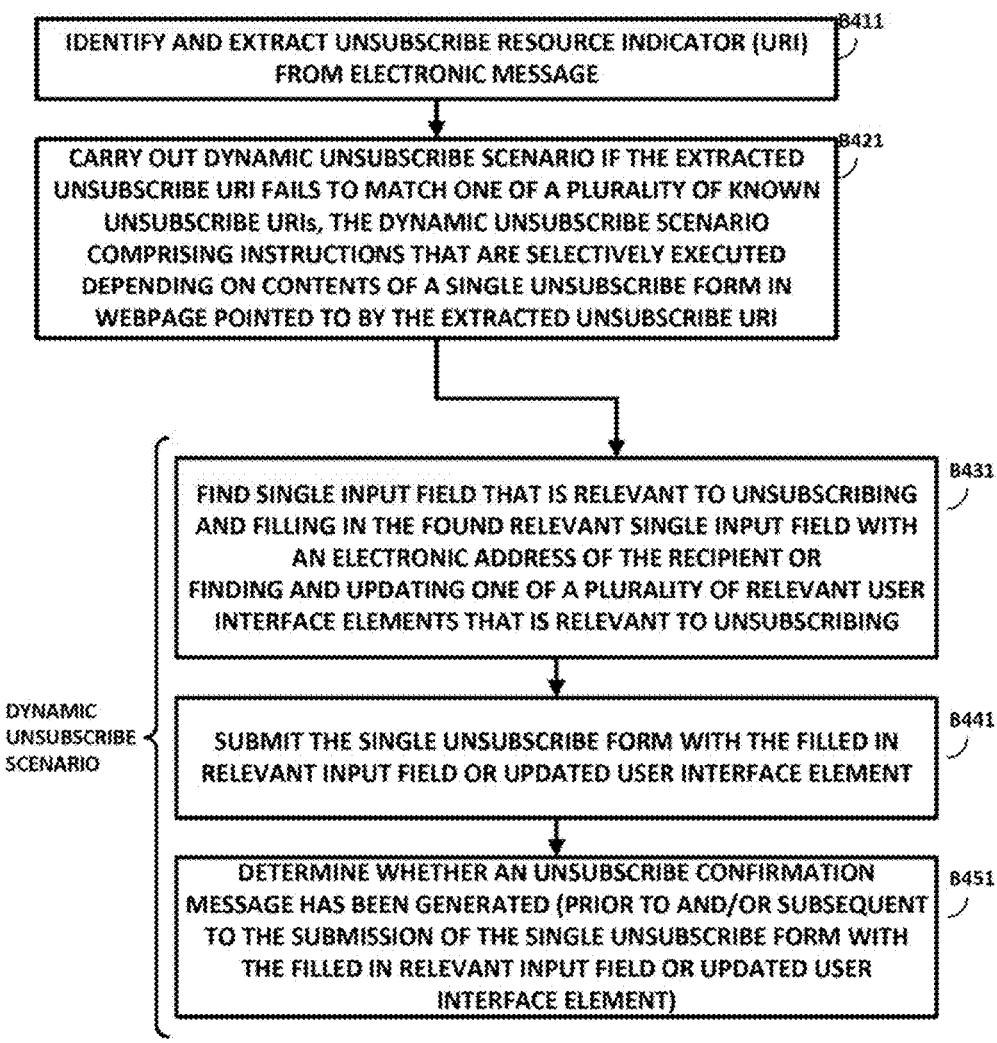
FIG. 4 is a flowchart of a computer-implemented method of unsubscribing a recipient from electronic messages, according to one embodiment.

FIG. 4 is a flowchart of a computer-implemented method of unsubscribing a recipient from electronic messages, according to one embodiment. As shown therein, block B411 calls for identifying and extracting an unsubscribe URI from the electronic message. As shown at block B421, a dynamic unsubscribe scenario may be carried if the extracted unsubscribe URI fails to match one of the known unsubscribe URIs. According to one embodiment, the dynamic unsubscribe scenario may comprise computer instructions (in the Lua programming language, for example) that may be selectively executed (by email server 312, for example) depending on the contents of a single unsubscribe form in the accessed webpage pointed to by the identified and extracted unsubscribe URI in the received electronic message.

According to one embodiment and as fully developed herein, the instructions of the dynamic unsubscribe scenario may selectively comprise, as shown at B431, finding a single input field in the accessed webpage that is relevant to unsubscribing and filling in the found relevant single input field with an electronic address of the recipient or finding and updating one of a plurality of user interface elements (check box, radio button, etc.) that is relevant to unsubscribing the recipient from the electronic message. Block B441 calls for submitting the single unsubscribe form with the filled in single relevant input field or updated user interface element (to the email sender or author, for example). Lastly, block B451 calls for determining whether an unsubscribe confirmation message (e.g., "You have been unsubscribed from future mailings" or some such) has been generated prior to and/or subsequent to the submission of the single unsubscribe form with the filled in single relevant input field or updated user interface element.

One embodiment further includes carrying out one of a plurality of static unsubscribe scenarios if the identified and extracted unsubscribe URI matches one of the plurality of known unsubscribe URIs. Each of the plurality of static unsubscribe scenarios may correspond to a respective one of the plurality of known URIs and may include a predetermined set of instructions configured to unsubscribe the recipient from further electronic messages associated with the respective unsubscribe URI. The computer-implemented method may further comprise finding and clicking a single unsubscribe link if the single unsubscribe form is not found in the accessed webpage, as shown at B34 and B35 in FIG. 2. The method, according to one embodiment, may comprise receiving, over computer network 306, a plurality of unsubscribe requests from a corresponding plurality of recipients of electronic messages. For each of the received plurality of requests, one of the static unsubscribe scenarios or the dynamic unsubscribe scenario may be selectively carried out. The found single input field may comprise a single empty email field and the method may further comprise filling in the single empty email field. The found relevant user interface element may, for example, comprise a single checkbox that may be determined to be relevant to unsubscribing the recipient. Alternatively, the found relevant user interface element may comprise a single radio button that is relevant to unsubscribing the recipient. The found user interface element may be differently configured and is not limited to radio button, checkboxes and the like. One embodiment reports successfully unsubscribing upon determining that the unsubscribe confirmation message has been generated prior or subsequent to the submission of the single unsubscribe form. Conversely, failure to unsubscribe may be reported upon determining that the unsubscribe confirmation message has not been generated subsequent to the submission of the single unsubscribe form. One embodiment comprises determining whether the found single input field or user interface element is relevant to unsubscribing the recipient by retrieving at least one unsubscribe relevance rule from storage and sequentially applying the retrieved unsubscribe relevance rule(s).

Figure 5:
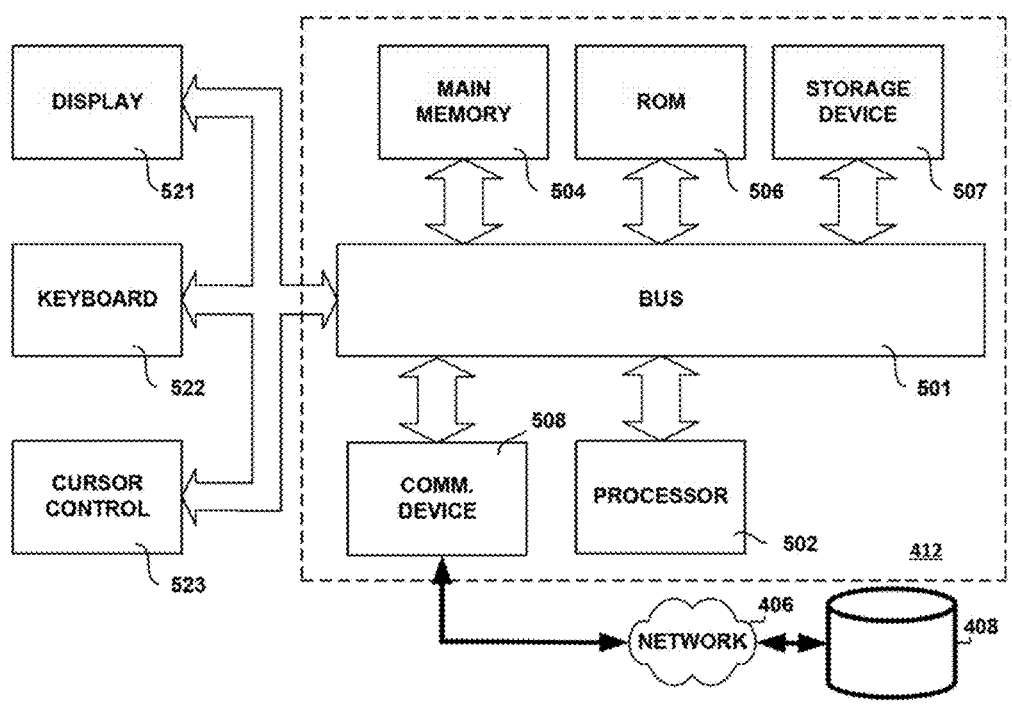
FIG. 5 is a block diagram of a computing device configured to carry out a method according to one embodiment.

FIG. 5 is a block diagram of a computing device configured to carry out a method according to one embodiment. FIG. 5 illustrates a block diagram of a computing device 412 upon and with which embodiments may be implemented. Computing device 412 may include a bus 501 or other communication mechanism for communicating information, and one or more processors 502 coupled with bus 501 for processing information and executing instructions. Computing device 412 may further comprise a random access memory (RAM) or other dynamic storage device 504 (referred to as main memory), coupled to bus 501 for storing information and instructions to be executed by processor(s) 502. Main memory 504 also may be used for storing temporary variables or other intermediate information during execution of instructions by processor 502. Computing device 412 also may include a read only memory (ROM) and/or other static storage device 506 coupled to bus 501 for storing static information and instructions for processor(s) 502. A data storage device 507, such as a magnetic disk or solid state data storage device may be coupled to bus 501 for storing information and instructions. The computing device 412 may also be coupled via the bus 501 to a display device 521 for displaying information to a computer user. An alphanumeric input device 522, including alphanumeric and other keys, may be coupled to bus 501 for communicating information and command selections to processor(s) 502. Another type of user input device is cursor control 423, such as a mouse, a trackball, touch functionality or cursor direction keys for communicating direction information and command selections to processor(s) 502 and for controlling cursor movement on display 521. The computing device 412 may be coupled, via a communication device (e.g., modem, Network Interface Card (NIC)) to computer network 406 and to the storage database(s) 408 configured to store the static and dynamic unsubscribe scenarios, according to one embodiment.

Embodiments are related to the use of computing device 412 to unsubscribe message recipients from unwanted electronic messages. According to one embodiment, the methods, devices and systems described herein may be provided by one or more computing devices 412 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory or other non-transitory medium external to the microprocessor, or integrated with the microprocessor. In another embodiment, the instructions may be stored on a disk and read into a volatile semiconductor memory before execution by the microprocessor.

One embodiment is non-transitory machine-readable medium (a data carrier, mass storage device, etc.) having data stored thereon representing sequences of instructions which, when executed by a computing device, causes the computing device carry out the functionality shown and described relative to FIG. 1-5.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of unsubscribing a recipient of an unwanted electronic message without exposing a computing device having received the unwanted electronic message to malware or a virus infection, the computer-implemented method comprising:
   receiving, over a computer network, the unwanted electronic message by a computing device;
   identifying and extracting, by the computing device, an unsubscribe Universal Resource Indicator (URI) from the received unwanted electronic message;
   accessing, over the computer network, a webpage pointed to by the extracted unsubscribe URI;
   carrying out, by the computing device and without involvement of the recipient of the unwanted electronic message, a dynamic unsubscribe scenario, when the extracted unsubscribe URI fails to match one of a plurality of known unsubscribe URIs, the dynamic unsubscribe scenario being configured to carry out an analysis of contents of the webpage pointed to by the extracted unsubscribe URI by executing instructions stored in and retrieved from a memory accessible to the computing device, the retrieved instructions being selectively executed by the computing device depending on contents of a single unsubscribe form in the webpage pointed to by the extracted unsubscribe URI, the instructions of the dynamic unsubscribe scenario comprising:
      determining whether a single input field that is relevant to unsubscribing is present in the accessed webpage;
         when the single input field is determined to be present in the accessed webpage, filling in single input field with an electronic address of the recipient; and
         when the single input field is determined not to be present in the accessed webpage, finding a plurality of user interface elements in the accessed webpage and updating a found one of the plurality of user interface elements in the accessed webpage that is relevant to unsubscribing by retrieving at least one unsubscribe relevance rule from a storage and applying the retrieved at least one unsubscribe relevance rule;
   submitting over the computer network, to the accessed webpage, the single unsubscribe form with the filled in single relevant input field or updated user interface element; and
   determining, by the computing device, whether an unsubscribe confirmation message has been generated at least one of prior to or subsequent to the submission of the single unsubscribe form with the filled in single relevant input field or updated user interface element.

2. The computer-implemented method of claim 1, further comprising carrying out one of a plurality of static unsubscribe scenarios when the identified and extracted unsubscribe URI matches one of the plurality of known unsubscribe URIs, each of the plurality of static unsubscribe scenarios corresponding to a respective one of the plurality of known URIs and comprising a predetermined set of instructions configured to unsubscribe the recipient from unwanted electronic messages associated with the respective unsubscribe URI.

3. The computer-implemented method of claim 2, further comprising identifying and extracting a plurality of unsubscribe URIs from the unwanted electronic message and, for each identified and extracted unsubscribe URI, selectively carrying out the dynamic unsubscribe scenario or one of the plurality of static unsubscribe scenarios.

4. The computer-implemented method of claim 1, further comprising finding and clicking a single unsubscribe link when the single unsubscribe form is not found in the webpage pointed to by the extracted unsubscribe URI.

5. The computer-implemented method of claim 1, further comprising receiving, over the computer network, a plurality of requests, from a corresponding plurality of recipients of unwanted electronic messages, to unsubscribe from receiving further unwanted electronic messages from identified unwanted electronic message senders and, for each of the received plurality of requests, selectively carrying out the dynamic unsubscribe scenario or a selected one of the plurality of static unsubscribe scenarios.

6. The computer-implemented method of claim 1, wherein the found single input field comprises a single empty email field and wherein the method further comprises filling in the single empty email field.

7. The computer-implemented method of claim 1, wherein the found one of the plurality of relevant user interface elements comprises a single checkbox that is relevant to unsubscribing the recipient.

8. The computer-implemented method of claim 1, wherein the found one of the plurality of relevant user interface elements comprises a single radio button that is relevant to unsubscribing the recipient.

9. The computer-implemented method of claim 1, further comprising reporting successfully unsubscribing upon determining that the unsubscribe confirmation message has been generated.

10. The computer-implemented method of claim 1, further comprising reporting failure to unsubscribe upon determining that the unsubscribe confirmation message has not been generated.

11. A computing device coupled to a computer network, configured to unsubscribe recipients from receiving further unwanted electronic messages without exposing the computing device to malware or virus infection, the computing device comprising:
at least one processor;
at least one data storage device coupled to the at least one processor;
a plurality of processes spawned by said at least one processor, the processes including processing logic for, responsive to receiving, over the computer network, an indication of a single click from a recipient of an unwanted electronic message:
receiving, over a computer network, the unwanted electronic message in a computing device;
identifying and extracting, by the computing device, an unsubscribe Universal Resource Indicator (URI) from the received unwanted electronic message;
accessing, over the computer network, a webpage pointed to by the extracted unsubscribe URI;
carrying out, by the computing device and without involvement of the recipient of the unwanted electronic message, a dynamic unsubscribe scenario when the extracted unsubscribe URI fails to match one of a plurality of known unsubscribe URIs, the dynamic unsubscribe scenario being configured to carry out an analysis of contents of the webpage pointed to by the extracted unsubscribe URI by executing instructions stored in and retrieved from a memory accessible to the computing device, the retrieved instructions being selectively executed by the computing device depending on contents of a single unsubscribe form in the webpage pointed to by the extracted unsubscribe URI, the instructions of the dynamic unsubscribe scenario comprising:
determining whether a single input field that is relevant to unsubscribing is present in the accessed webpage;
when the single input field is determined to be present in the accessed webpage, filling in single input field with an electronic address of the recipient; and
when the single input field is determined not to be present in the accessed webpage, finding a plurality of user interface elements in the accessed webpage and updating the found one of a plurality of user interface elements in the accessed webpage that is relevant to unsubscribing by retrieving at least one unsubscribe relevance rule from a storage and applying the retrieved at least one unsubscribe relevance rule;
submitting over the computer network, to the accessed webpage, the single unsubscribe form with the filled in single relevant input field or updated user interface element; and
determining, by the computing device, whether an unsubscribe confirmation message has been generated at least one of prior to or subsequent to the submission of the single unsubscribe form with the filled in single relevant input field or updated user interface element.

12. The computing device of claim 11, further comprising processing logic for carrying out one of a plurality of static unsubscribe scenarios when the identified and extracted unsubscribe URI matches one of the plurality of known unsubscribe URIs, each of the plurality of static unsubscribe scenarios corresponding to a respective one of the plurality of known URIs and comprising a predetermined set of instructions configured to unsubscribe the recipient from unwanted electronic messages associated with the respective unsubscribe URI.

13. A computing device of claim 11, further comprising processing for logic finding and clicking a single unsubscribe link when the single unsubscribe form is not found in the webpage pointed to by the extracted unsubscribe URI.

14. A computing device of claim 11, further comprising processing logic for receiving, over the computer network, a plurality of requests, from a corresponding plurality of recipients of unwanted electronic messages, to unsubscribe from receiving further unwanted electronic messages from identified unwanted electronic message senders and, for each of the received plurality of requests, selectively carrying out the dynamic unsubscribe scenario or a selected one of the plurality of static unsubscribe scenarios.

15. A computing device of claim 11, wherein the found single input field comprises a single empty email field and wherein the method further comprises filling in the single empty email field.

16. A computing device of claim 11, wherein the found one of the plurality of relevant user interface elements comprises a single checkbox that is relevant to unsubscribing the recipient.

17. A computing device of claim 11, wherein the found one of the plurality of relevant user interface elements comprises a single radio button that is relevant to unsubscribing the recipient.

18. A computing device of claim 11, further comprising processing logic for reporting successfully unsubscribing upon determining that the unsubscribe confirmation message has been generated subsequent to the submission of the single unsubscribe form.

19. A computing device of claim 11, further comprising processing logic for reporting failure to unsubscribe upon determining that the unsubscribe confirmation message has not been generated subsequent to the submission of the single unsubscribe form.

20. A computing device of claim 11, further comprising processing logic for identifying and extracting a plurality of unsubscribe URIs from the unwanted electronic message and, for each identified and extracted unsubscribe URI, selectively carrying out the dynamic unsubscribe scenario or one of the plurality of static unsubscribe scenarios.

21. A machine-readable non-transitory medium having data stored thereon representing sequences of instructions which, when executed by a computing device coupled to a computer network, causes the computing device to unsubscribe from an unwanted electronic message without becoming exposed to malware or a virus infection, the sequences of instructions being configured to cause the computing device to:
 identify and extract an unsubscribe Universal Resource Indicator (URI) from the unwanted electronic message;
 carry out, without involvement of a recipient of the unwanted electronic message, a dynamic unsubscribe scenario when the extracted unsubscribe URI fails to matches one of a plurality of known unsubscribe URIs, the dynamic unsubscribe scenario being configured to carry out an analysis of contents of the webpage pointed to by the extracted unsubscribe URI by executing instructions that are selectively executed depending on contents of a single unsubscribe form in a webpage pointed to by the extracted unsubscribe URI, the instructions of the dynamic unsubscribe scenario comprising:
 determining whether a single input field that is relevant to unsubscribing is present in the accessed webpage;
  when the single input field is determined to be present in the accessed webpage, filling in single input field with an electronic address of the recipient; and
  when the single input field is determined not to be present in the accessed webpage, finding a plurality of user interface elements in the accessed webpage and updating the found one of a plurality of user interface elements in the accessed webpage that is relevant to unsubscribing by retrieving at least one unsubscribe relevance rule from a storage and applying the retrieved at least one unsubscribe relevance rule;
 submitting over the computer network, to the accessed webpage, the single unsubscribe form with the filled in single relevant input field or updated user interface element; and
 determining, by the computing device, whether an unsubscribe confirmation message has been generated at least one of prior to or subsequent to the submission of the single unsubscribe form with the filled in single relevant input field or updated user interface element.

* * * * *